(12) United States Patent
Cohen et al.

(10) Patent No.: US 10,613,853 B2
(45) Date of Patent: *Apr. 7, 2020

(54) UPDATING SOFTWARE COMPONENTS THROUGH ONLINE STORES

(71) Applicant: Microsoft Technology Licensing, LLC, Redmond, WA (US)

(72) Inventors: Jordan Frederick Cohen, Seattle, WA (US); Nikki Josephine Barry, Redmond, WA (US); Shiaf Ramlan, Redmond, WA (US); David Pokluda, Redmond, WA (US); Rajasekaran Rangarajan, Kirkland, WA (US); Ullattil Shaji, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,627

(22) Filed: May 20, 2019

(65) Prior Publication Data

US 2019/0272166 A1 Sep. 5, 2019

Related U.S. Application Data

(63) Continuation of application No. 15/478,422, filed on Apr. 4, 2017, now Pat. No. 10,318,273, which is a
(Continued)

(51) Int. Cl.
*G06F 8/65* (2018.01)

(52) U.S. Cl.
CPC .................................. *G06F 8/65* (2013.01)

(58) Field of Classification Search
CPC ........................................................ G06F 8/65
(Continued)

(56) References Cited

U.S. PATENT DOCUMENTS

| 6,185,734 B1 * | 2/2001 | Saboff ................ G06F 9/44521 717/164 |
| 7,996,814 B1 * | 8/2011 | Qureshi ............... G06F 11/079 717/120 |

(Continued)

FOREIGN PATENT DOCUMENTS

KR 20120014218 A 2/2012

OTHER PUBLICATIONS

Jiang Du and Ti Kang, "Online application update cross platform based on ACE," 2011 3rd International Conference on Computer Research and Development, Shanghai, 2011, pp. 91-94. (Year: 2011).*

(Continued)

*Primary Examiner* — James D. Rutten (57) ABSTRACT

The present invention extends to methods, systems, and computer program products for updating software components through online stores. A computing device interacts with an online store to download applications and frameworks that are distributed from the online store. The computer system includes an operating system configured to keep distributed applications and frameworks updated. The operating system can, automatically and without user intervention, intelligently schedule and attempt application and framework updates in a manner that minimizes user disruptions. The operating system can manage application and framework updating for any and/or all user accounts on a computing device. The operating system can manage updates even when each application and/or framework is to be separately installed for different user accounts that have the application and/or framework installed.

20 Claims, 7 Drawing Sheets

Related U.S. Application Data continuation of application No. 13/968,452, filed on Aug. 16, 2013, now Pat. No. 9,645,809.

(60) Provisional application No. 61/828,658, filed on May 29, 2013.

(58) Field of Classification Search
USPC .......................................................... 717/173
See application file for complete search history.

(56) References Cited

U.S. PATENT DOCUMENTS

| | | | | |
|---|---|---|---|---|
| 2002/0156889 | A1* | 10/2002 | Crudele | G06F 8/61 709/224 |
| 2005/0086636 | A1* | 4/2005 | Sobeski | G06F 9/451 717/103 |
| 2006/0106806 | A1* | 5/2006 | Sperling | G06F 8/65 707/10 |
| 2007/0169103 | A1* | 7/2007 | Bhatkhande | G06F 8/71 717/170 |
| 2008/0028395 | A1* | 1/2008 | Motta | G06F 8/65 717/177 |
| 2008/0115226 | A1* | 5/2008 | Welingkar | G06F 21/88 726/28 |
| 2009/0144719 | A1* | 6/2009 | Pazdziora | G06F 8/65 717/171 |
| 2009/0307682 | A1* | 12/2009 | Gharabally | G06F 8/65 717/172 |
| 2010/0162229 | A1* | 6/2010 | Tsuk | G06F 9/44526 717/175 |
| 2012/0278902 | A1* | 11/2012 | Martin | G06F 8/313 726/28 |
| 2013/0067447 | A1* | 3/2013 | Sannidhanam | G06F 8/60 717/169 |

OTHER PUBLICATIONS

Jung-Kuei Hsieh, Yi-Ching Hsieh, Appealing to Internet-based freelance developers in smartphone application marketplaces, International Journal of Information Management, vol. 33, Issue 2, Apr. 2013, pp. 308-317, ISSN 0268-4012 (Year: 2013).*

Bouchard, Anthony, "Auto App Updater' Updates Your App Store Apps in the Background Automatically", Retrieved at <<http://modmyi.com/forums/iphone-news/821149-auto-app-updater-updates-your-app-store-apps-background-automatically.html» Mar. 25, 2013, pp. 6 (Year: 2013).*

"Notice of Allowance Issued in Korean Patent Application No. 10-2015-7034024", dated Nov. 28, 2019, 5 Pages.

* cited by examiner

UPDATING SOFTWARE COMPONENTS THROUGH ONLINE STORES

CROSS-REFERENCE TO RELATED APPLICATIONS

This application is a continuation of and claims the benefit of and priority to U.S. patent application Ser. No. 15/478,422, entitled "Updating Software Components Through Online Stores", filed Apr. 4, 2017 by Jordan Frederick Cohen et al., which is a continuation of and claims the benefit of and priority to U.S. patent application Ser. No. 13/968,452, entitled "Updating Software Components Through Online Stores", filed Aug. 16, 2013 by Jordan Frederick Cohen et al., which claims the benefit of U.S. Provisional Patent Application No. 61/828,658, entitled "Updating Software Components Through Online Stores", filed May 29, 2013, by Jordan Frederick Cohen et al. The contents of these applications are incorporated by reference herein in their entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Applications distributed from online stores often share common frameworks to reduce disk footprint and to enable shared components of different applications to be updated at the same time. Within at least some systems, application and framework updating is performed manually. Thus, under some circumstances frameworks can go un-updated. For example, when a new version of a framework is released, it may not be updated unless a new application or updated application was acquired, and new/updated application was expressly bound to a new version of the framework it used.

Many online stores include the ability to find, download, and install application and application updates. At least some applications distributed through an on the store share one or more common frameworks. Frameworks are typically developed for backward compatible. So typically advantageous for users to have the latest versions of those frameworks, even if developers create an application using an older version of a framework. Framework updates can include security fixes, performance improvements, and other benefits.

However, as descried, framework updates are not guaranteed to be downloaded. A user may only ever get the version of a framework "bound" to an application. That is, the version of the framework used when the application was developed. Thus, under a variety of scenarios, a user may never get available framework updates. In one scenario, a developer never updates their application to be bound to a newly released framework. In another scenario, a user never decides to install available updates. In a further scenario, a user never acquires a new application that happens to be bound to an updated framework. As such, the user can be left in a potentially insecure, slow, or other undesirable state.

Further, conventional update techniques often result in relatively large application packages where things are either baked directly into the operating system and require operating system updates to improve them, or the common items are repeatedly included over and over again inside of each individual application. Duplicating common items consumes storage resources, and puts the onus on the developer to re-implement each change, and manually submit an update to each individual application.

BRIEF SUMMARY

The present invention extends to methods, systems, and computer program products for updating software components through online stores. In some embodiments, automatically, and without user intervention an application update query is sent an online store. The application update query queries the online store for updates to any of the plurality of applications installed at the computer system. Automatically, and without user intervention, a separate framework update query is sent to the online store in parallel with the application update query. The framework update query queries the online store for updates to any frameworks utilized by any of a pluralist of applications installed at the computer system.

A framework update is received in response to the framework update query. The framework update includes an update to a framework utilized by one or more applications installed at the computer system. Automatically, and without user intervention, the framework update is scheduled for installation at the computer system during an operating system maintenance window at the computer system. The framework update is installed at an available time to update the one or more applications at the computer system.

In other embodiments, a software component (e.g., an application or a framework) update is received from the online store. It is determined that the software component update is applicable to a plurality of user accounts at the computer system. The software component update is to be separately installed for each of the plurality of accounts. Automatically, and without user intervention, the software component update is scheduled for installation for each of the plurality of user accounts during an operating system maintenance window at the computer system. For each of the plurality of accounts, the software component update is installed at an available time to update the software component for the user account.

In further embodiments, a user command is received to acquire at least a portion of an application from the online store. It is determined that the application is bound to a version of a framework. It is also determined that a newer version of the framework is available from the online store. The newer version of the framework is more recently updated than the version of the framework.

A request is sent to the online store for the at least a portion of the application and the newer version of the framework. A newer version of the framework is received from the online store in response to the request. Automatically, and without user intervention, the newer version of the framework is scheduled for installation at the computer system. The newer version of the framework installed at an available time to at least update the application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for updating software components through online stores. In some embodiments, automatically, and without user intervention an application update query is sent an online store. The application update query queries the online store for updates to any of the plurality of applications installed at the computer system. Automatically, and without user intervention, a separate framework update query is sent to the online store in parallel with the application update query. The framework update query queries the online store for updates to any frameworks utilized by any of a pluralist of applications installed at the computer system.

A framework update is received in response to the framework update query. The framework update includes an update to a framework utilized by one or more applications installed at the computer system. Automatically, and without user intervention, the framework update is scheduled for installation at the computer system during an operating system maintenance window at the computer system. The framework update is installed at an available time to update the one or more applications at the computer system.

In other embodiments, a software component (e.g., an application or a framework) update is received from the online store. It is determined that the software component update is applicable to a plurality of user accounts at the computer system. The software component update is to be separately installed for each of the plurality of accounts. Automatically, and without user intervention, the software component update is scheduled for installation for each of the plurality of user accounts during an operating system maintenance window at the computer system. For each of the plurality of accounts, the software component update is installed at an available time to update the software component for the user account.

In further embodiments, a user command is received to acquire at least a portion of an application from the online store. It is determined that the application is bound to a version of a framework. It is also determined that a newer version of the framework is available from the online store. The newer version of the framework is more recently updated than the version of the framework.

A request is sent to the online store for the at least a portion of the application and the newer version of the framework. A newer version of the framework is received from the online store in response to the request. Automatically, and without user intervention, the newer version of the framework is scheduled for installation at the computer system. The newer version of the framework installed at an available time to at least update the application.

In some embodiments, a single query for acquiring an application contains information for the application being acquired. An online store can return information for the application as well as any newer frameworks applicable to the application.

In other embodiments, during automatic and/or interactive updating a (e.g., client side) agent sends information for applications and/or frameworks it is aware of. An online store can return information for any newer applications (updates) and frameworks (updates).

Automatic updating can include scheduling downloaded applications (updates) and framework (updates) to be installed, for example, during a maintenance window.

User initiated application acquisition and/or interactive updating can be installed as portion of a user issued command (and can be more immediate). Installation can be handled internally subsequent to applications and/or frameworks being downloaded without further user actions.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and the in the following claims, a "framework" is defined as software providing generic functionality that can be selectively changed by additional user-written code, thus providing application-specific software. A (software) framework is a reusable software platform used to develop applications, products and solutions. Frameworks include support programs, compilers, code libraries, tool sets, and application programming interfaces (APIs) that bring together all the different components to enable development of a project or solution.

In general, embodiments of the invention relate to updating software components through an online store. A computing device interacts with an online store to download applications and frameworks that are distributed from the online store. The computer system includes an operating system configured to keep distributed applications and frameworks updated. The operating system can, automatically and without user intervention, intelligently schedule and attempt application and framework updates in a manner that minimizes user disruptions.

The operating system can manage application and framework updating for any and/or all user accounts on a computing device. The operating system can manage updates even when each application and/or framework is to be separately installed for different user accounts that have the application and/or framework installed. The operating system can also avoid downloading and updating applications and frameworks the computing device is connected to costed networks. The online store can track separate telemetry for each distributed application and framework.

Updating Frameworks Independently of Applications

Figure 1:
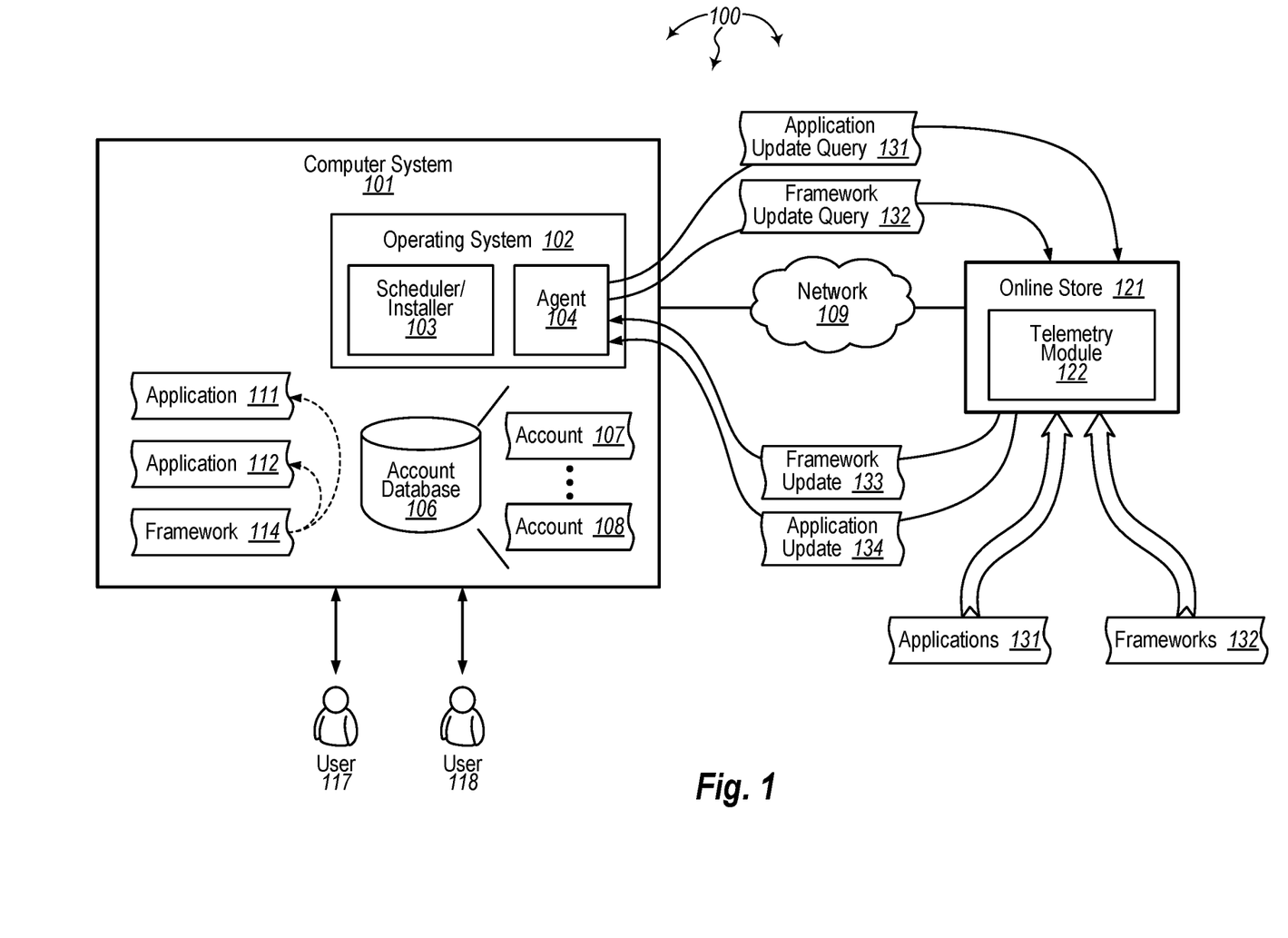
FIG. 1 illustrates an example computer architecture that facilitates updating software components through an online store.

FIG. 1 illustrates an example computer architecture 100 that facilitates updating software components through an online store. Referring to FIG. 1, computer architecture 100 includes computer system 101 and online store 121. Each of computer system 101 and online store 121 can be connected to one another over (or be part of) network 109, such as, for example, a Local Area Network ("LAN"), a Wide Area Network ("WAN"), and even the Internet. Accordingly, computer system 101 and online store 121 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Referring now to FIG. 1, computer system 101 includes operating system 102 and account database 106. Operating system 102 can be a collection of software that manages computer hardware resources of computer system 101 and provides common services for applications running at computer system 101. Operating system 102 can be virtually an operating system including, but not limited to: Microsoft® Windows®, Apple® iOS®, and Google® Android™.

Operating system 102 further includes scheduler 103 and agent 104. In general, scheduler/installer 103 is configured to schedule applications, application updates, frameworks, and framework updates for installation at computer system 101. Scheduler/installer 103 is also configured to attempt installation of applications, application updates, frameworks, and framework updates for at computer system 101 at scheduled (and/or other available) times.

Computer system 101 may be used by a single user or may be used by a plurality of users. Account database 106 stores information for different user accounts include accounts 107 and 108. Different user accounts can correspond to the same or different users. A user may be have one user account or may have multiple user accounts. For example, accounts 107 and 108 may correspond to users 117 and 118 respectively. On the other hand, both accounts 107 and 108 may be accounts of user 117. A user may have multiple different user accounts to access computer system 101 with different privileges (e.g., as a regular user or an administrator). Each different account can be associated with its own settings and resources.

Computer system 101 can also have one or more applications and one or more corresponding frameworks installed, such as, for example, applications 111 and 112 and framework 114. One or more applications can depend on the same framework. For example, as indicated by the dashed lines applications 111 and 112 can depend on framework 114.

In some embodiments, applications and/or frameworks are installed at computer system 101 for a number of different user accounts. Thus, applications and/or frameworks can be installed at computer system 101 multiple times. As such, application updates and/or framework updates are installed multiple times, once for each user account that has the corresponding to be updated application and/or framework installed.

In general, online store 121 is configured to distribute applications, application updates, frameworks, and framework updates to other computer systems. For example, online store 121 can distribute any of applications 131, frameworks 133 or updates thereto to other computer systems, including computer system 101. Telemetry module 122 can track separate telemetry data for distributed applications, application updates, frameworks, and framework updates.

In some embodiments, online store 121 has a purchase module for purchasing applications and/or frameworks. As such, some of applications 131 and/or frameworks 132 may need to be purchased before distribution is permitted. Others of applications 131 and/or frameworks 132 may be distributed without purchase (i.e., they are free). Even when an application and/or framework is initially purchased, corresponding updates may be distributed without further purchase (i.e., updates are free).

Returning to computer system 101, agent 104 is configured to query online store 121 from time to time or at specified intervals for updates corresponding to applications and/or frameworks installed at computer system 101. In some embodiments, agent 104 queries online store 121 automatically and without user intervention. In other embodiments, a user causes agent 104 to query online store 121. Separate application update queries and framework update queries can be sent to online 121 independently of one another. Agent 104 can accept any returned application updates and/or framework updates. Agent 104 can notify scheduler/installer 103 of any updates so that the updates can be scheduled for installation and subsequently installed.

Figure 2:
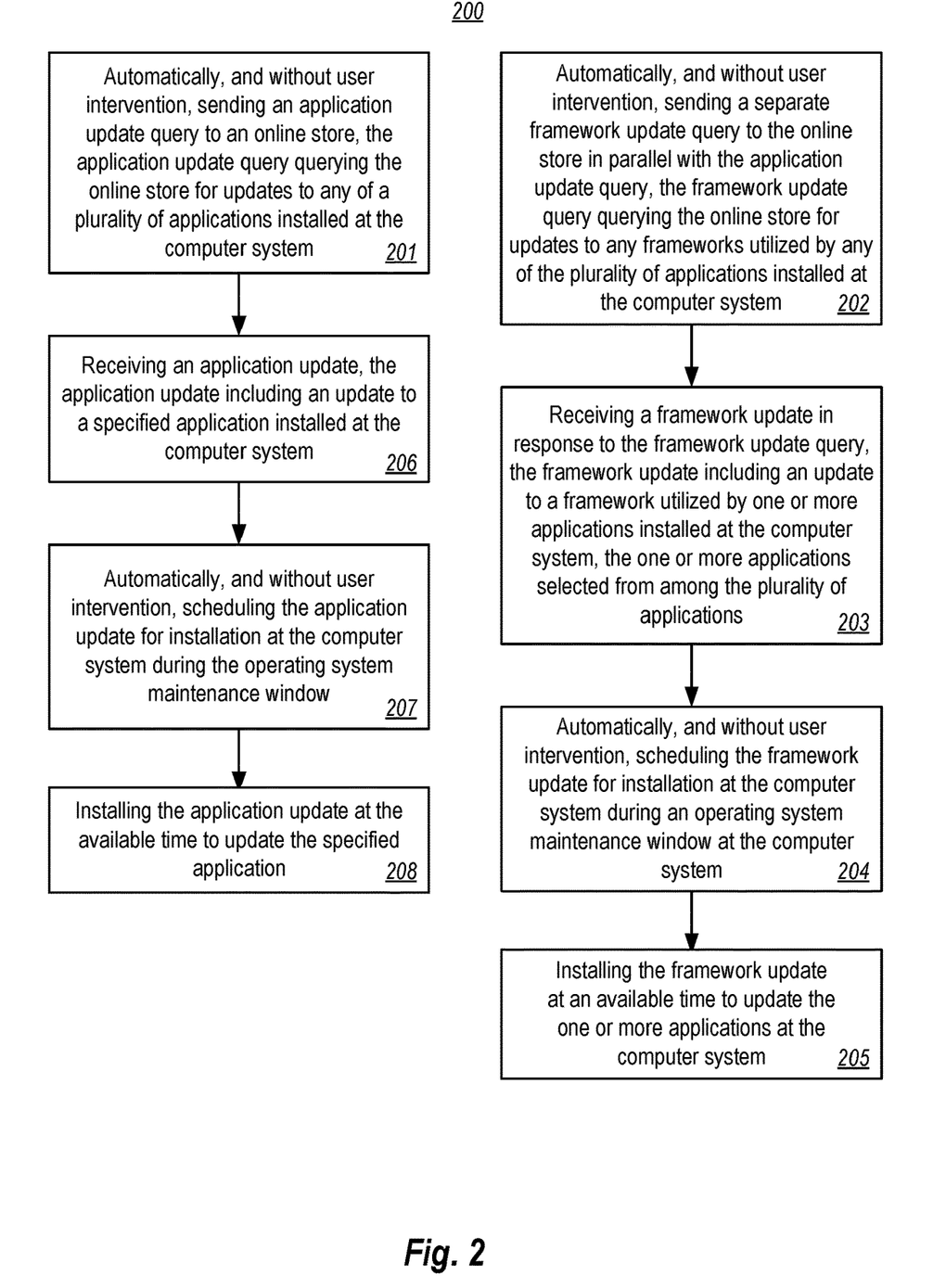
FIG. 2 illustrates a flow chart of an example method for updating software components through an online store.

FIG. 2 illustrates a flow chart of an example method 200 for updating software components through an online store. Method 200 will be described with respect to the components and data of computer architecture 100.

Method 200 includes automatically, and without user intervention, sending an application update query to the online store, the application update query querying the online store for updates to any of the plurality of applications installed at the computer system (201). For example, agent 104 can automatically send application update query 131 to online store 121. Application update query 131 can query online store 121 for any updates to applications installed at computer system 101.

Method 200 includes automatically, and without user intervention, sending a separate framework update query to the online store in parallel with the application update query, the framework update query querying the online store for updates to any frameworks utilized by any of the plurality of applications installed at the computer system (202). For example, agent 104 can automatically send framework update query 132 to online store 121 in parallel with application update query 131. Framework update query 132 can independently query online store 121 for updates to frameworks utilized by any of the applications installed at computer system 101, such as, for example, application 111, application 112, etc.

Online store 121 can receive framework update query 132. Online store 121 can determine that there is an update to framework 114. Online store 121 can return framework update 133 (the update to framework 114) to computer system 101.

Method 200 includes receiving a framework update in response to the framework update query, the framework update including an update to a framework utilized by one or more applications installed at the computer system, the one or more applications selected from among the plurality of applications (203). For example, agent 104 can receive framework update 133 from online store 121.

Method 200 includes automatically, and without user intervention, scheduling the framework update for installation at the computer system during an operating system maintenance window at the computer system (204). For example, scheduler/installer 103 can schedule framework update 133 for installation. Installation can be scheduled (possibly at different times) for each of one or more user accounts that have framework 114 installed. For example, installation can be schedule for one or more both of user accounts 107 and 108. Scheduler/installer 103 can use any of a variety of different algorithms when determining an installation schedule for framework update 133. Some algorithms can include scheduling installation of a framework update for a maintenance window of operating system 102, system idle time, or the next time a user logs on.

Method 200 includes installing the framework update at an available time to update the one or more applications at the computer system (205). For example, scheduler/installer 103 can install framework update 133 at an available time to update one or more of applications 111 and 112. Framework update 133 can be installed (possibly at different times) for each of one or more user accounts. For example, framework update 133 can be installed at one (available) time for user account 107 and/or can be installed at different (available) time for user account 108. An available time may be an operating system maintenance window or some other available time, such as, for example, system idle time or the next time a user logs on.

Online store 121 can receive application update query 131. Online store 121 can determine that there is an update to application 111. Online store 121 can return application update 134 (the update to application 111) to computer system 101.

Method 200 includes receiving an application update, the application update including an update to a specified application installed at the computer system (206). For example, agent 104 can receive application update 134 from online store 121.

Method 200 includes automatically, and without user intervention, scheduling the application update for installation at the computer system during the operating system maintenance window (207). For example, similar to scheduling of framework update 133, scheduler/installer 103 can schedule application update 134 for installation. Installation can be scheduled (possibly at different times) for each of one or more user accounts that have application 111 installed.

Method 200 includes installing the application update at the available time to update the specified application (208). For example, similar to framework update 133, scheduler/installer 103 can install application update 134 at an available time to update application 111. Application update 134 can be installed (possibly at different times) for each of one or more user accounts.

In some embodiments, application update query 131 and framework update query 132 are packaged as a single query. During a user initiated command for "acquiring an Application" the single query contains information of the Application being acquired and the Online Store returns back the information of the Application and any newer Frameworks applicable to the Application.

During "automatic updating" and "Interactive updating" agent (client side) sends information of the Application and Frameworks it is aware of Online Store returns back information of any newer Applications (updates) and Frameworks (updates).

Multi-Account Software Component Updates

Figure 3:
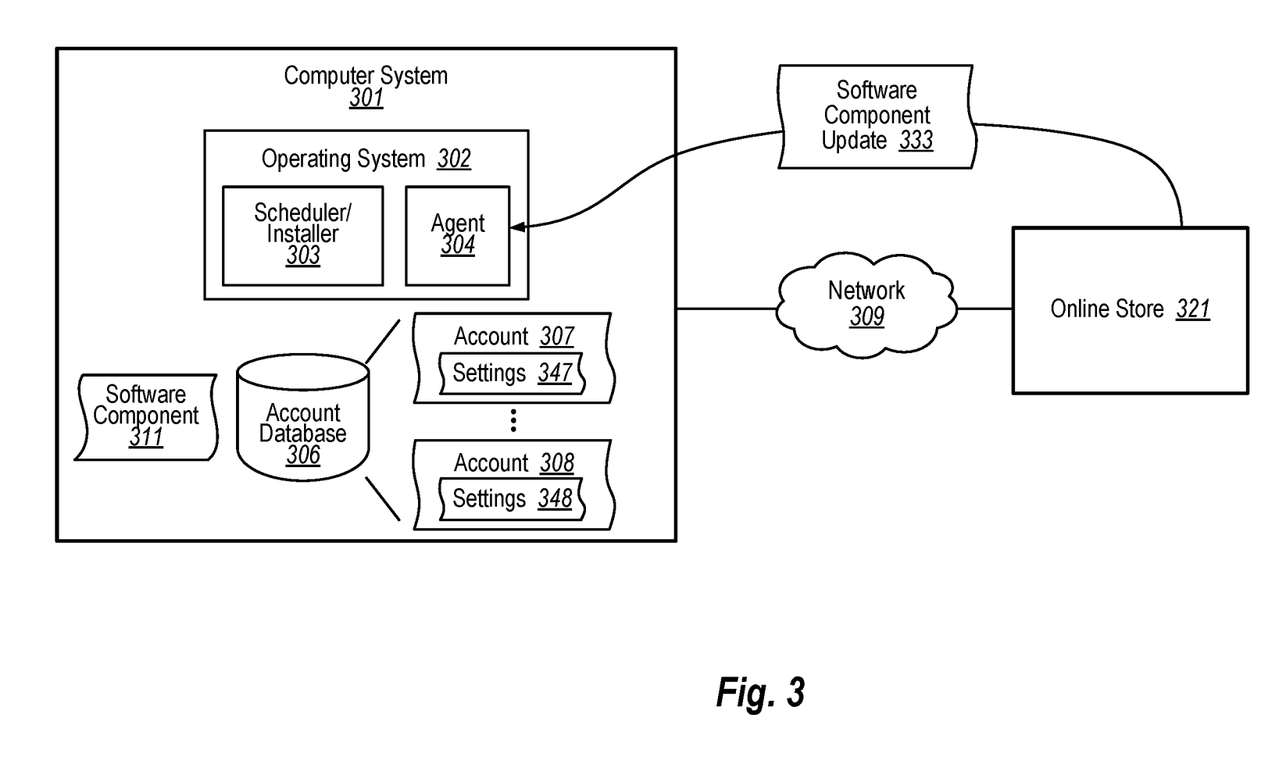
FIG. 3 illustrates an example computer architecture that facilitates updating software components through an online store.

FIG. 3 illustrates an example computer architecture 300 that facilitates updating software components through an online store. Referring to FIG. 3, computer architecture 300 includes computer system 301 and online store 321. Each of computer system 301 and online store 321 can be connected to one another over (or be part of) network 309, such as, for example, a Local Area Network ("LAN"), a Wide Area Network ("WAN"), and even the Internet. Accordingly, computer system 301 and online store 321 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Referring now to FIG. 3, computer system 301 includes operating system 302 and account database 306. Operating system 302 can be a collection of software that manages computer hardware resources of computer system 301 and provides common services for applications running at computer system 301. Operating system 302 can be virtually an operating system including, but not limited to: Microsoft® Windows®, Apple® iOS®, and Google® Android™.

Operating system 302 further includes scheduler 303 and agent 304. In general, scheduler/installer 303 is configured to schedule applications, application updates, frameworks, and framework updates for installation at computer system 101. Scheduler/installer 303 is also configured to attempt installation of applications, application updates, frameworks, and framework updates for at computer system 301 at scheduled (and/or other available) times.

As such, computer system 301 can also have one or more software components, such as, applications and/or frameworks installed.

Computer system 301 may be used by a single user or may be used by a plurality of users. Account database 306 stores information for different user accounts include accounts 307 and 308. Different user accounts can correspond to the same or different users. A user may be have one user account or may have multiple user accounts. For example, accounts 307 and 308 may correspond to users 317 and 318 respectively. On the other hand, both accounts 307 and 308 may be accounts of user 317. A user may have multiple different user accounts to access computer system 301 with different privileges (e.g., as a regular user or an administrator). Each different account can be associated with its own settings and resources. For example, accounts 307 and 308 are associated with settings 347 and 348 respectively. Account settings can include an indication of what applications and/or frameworks are installed for a corresponding user account.

Accordingly, software components can be installed at computer system 301 can be installed for a number of different user accounts such that the software components are installed multiple times. As such, updates to the software components are also installed multiple times (e.g., once for each user account).

In general, online store 321 is configured to distribute software components (e.g. applications, application updates, frameworks, and framework updates) to other computer systems. Online store 321 may or may not include a purchase module.

Returning to computer system 301, agent 304 is configured to query online store 321 from time to time or at specified intervals for updates corresponding to software components installed at computer system 301. In some embodiments, agent 304 queries online store 321 automatically and without user intervention. In other embodiments, a user causes agent 304 to query online store 321. Agent 104 can accept any returned software component updates. Agent 304 can notify scheduler/installer 303 of any updates so that the updates can be scheduled for installation and subsequently installed for multiple user accounts.

Figure 4:
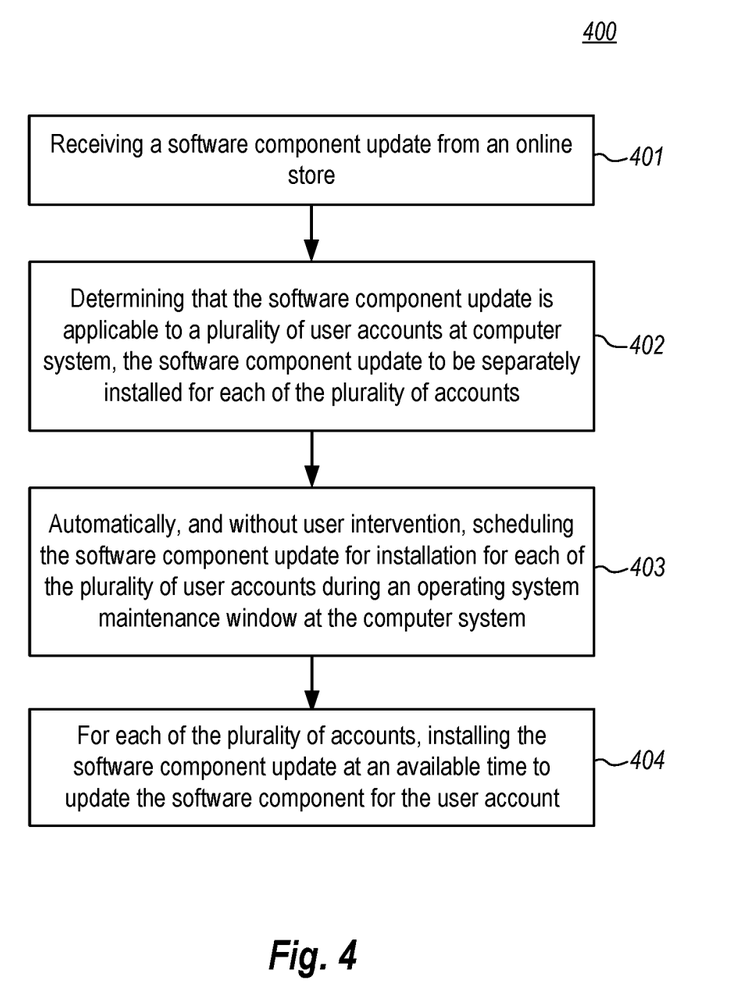
FIG. 4 illustrates a flow chart of an example method for updating software components through an online store.

FIG. 4 illustrates a flow chart of an example method 400 for updating software components through an online store. Method 400 will be described with respect to the components and data of computer architecture 300.

Method 400 includes receiving a software component update from the online store (401). For example, agent 304 can receive software component update 333 from online store 321. Software component update can be an update to software component 311 (e.g., an application or framework).

Method 400 includes determining that the software component update is applicable to a plurality of user accounts at the computer system, the software component update to be separately installed for each of the plurality of accounts (402). For example, agent 304 can refer to settings 347 and 348 to determine that software component 311 is installed for both user account 307 and user account 308 respectively. Agent 304 can further determine that software component update 333 is to be separately installed for user account 307 and user account 308.

Method 400 includes automatically, and without user intervention, scheduling the software component update for installation for each of the plurality of user accounts during an operating system maintenance window at the computer system (403). For example, scheduler/installer 403 can schedule installation of software component update 333 for each of user accounts 307 and 308 during a maintenance window for operating system 302.

Method 400 includes for each of the plurality of accounts, installing the software component update at an available time to update the software component for the user account (404). For example, for each of user accounts 307 and 308, scheduler/installer 403 can install software component update 333 at available (but possibly different) times. For example, framework update 133 can be installed for user account 107 at one (available) time, such as, the maintenance window for operating system 102. Framework update 133 can be installed for user account 108 at a different (available) time, such as, the next time user account 108 logs. In general, an available time may be an operating system maintenance window or some other available time, such as, for example, system idle time or the next time a user logs on.

Framework Update in Response to an Application Update Request

Figure 5:
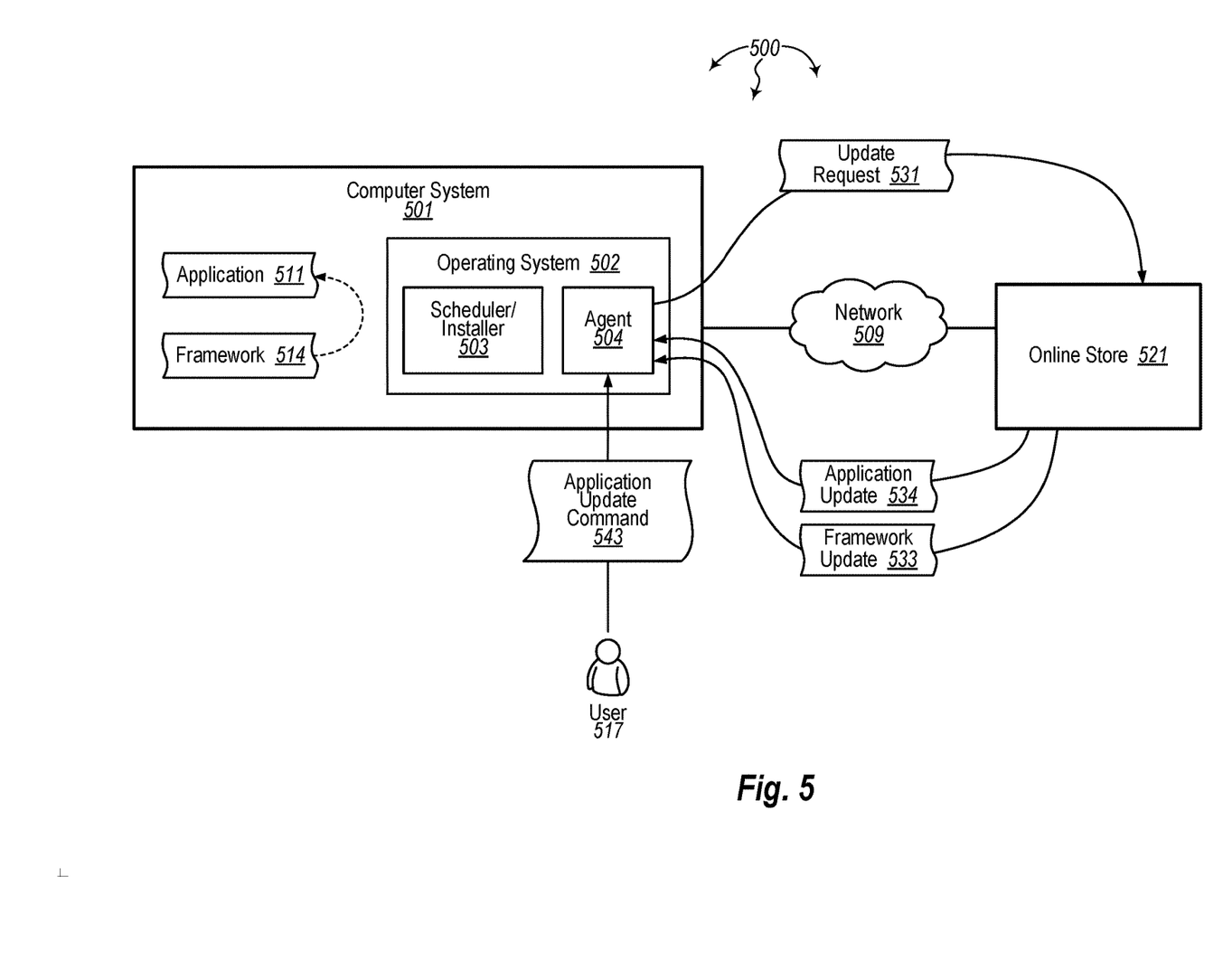
FIG. 5 illustrates an example computer architecture that facilitates updating software components through an online store.

FIG. 5 illustrates an example computer architecture 300 that facilitates updating software components through an online store. Referring to FIG. 5, computer architecture 500 includes computer system 501 and online store 521. Each of computer system 501 and online store 521 can be connected to one another over (or be part of) network 509, such as, for example, a Local Area Network ("LAN"), a Wide Area Network ("WAN"), and even the Internet. Accordingly, computer system 501 and online store 521 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Referring now to FIG. 5, computer system 501 includes operating system 502. Operating system 502 can be a collection of software that manages computer hardware resources of computer system 501 and provides common services for applications running at computer system 501. Operating system 502 can be virtually an operating system including, but not limited to: Microsoft® Windows®, Apple® iOS®, and Google® Android™.

Operating system 502 further includes scheduler 503 and agent 504. In general, scheduler/installer 503 is configured to schedule applications, application updates, frameworks, and framework updates for installation at computer system 501. Scheduler/installer 503 is also configured to attempt installation of applications, application updates, frameworks, and framework updates for at computer system 501 at scheduled (and/or other available) times.

As such, computer system 501 can also have applications which are bound to corresponding frameworks. For example, computer system 501 includes application 511 which is bound (as indicted by the dashed line) to framework 514.

Agent 504 is configured to query online store 521 for application and/or framework updates from time to time, at specified intervals, or in response to user commands. Agent 504 can accept any returned software component updates. Agent 504 can notify scheduler/installer 503 of any updates so that the updates can be scheduled for installation and subsequently installed for multiple user accounts.

In response to a user generated or automatically generated application update command requesting updates for an application, agent 504 can determine frameworks to which the application is bound. Agent 504 can formulate an additional independent request or supplement an existing request so that updates to such frameworks are also requested.

Figure 6:
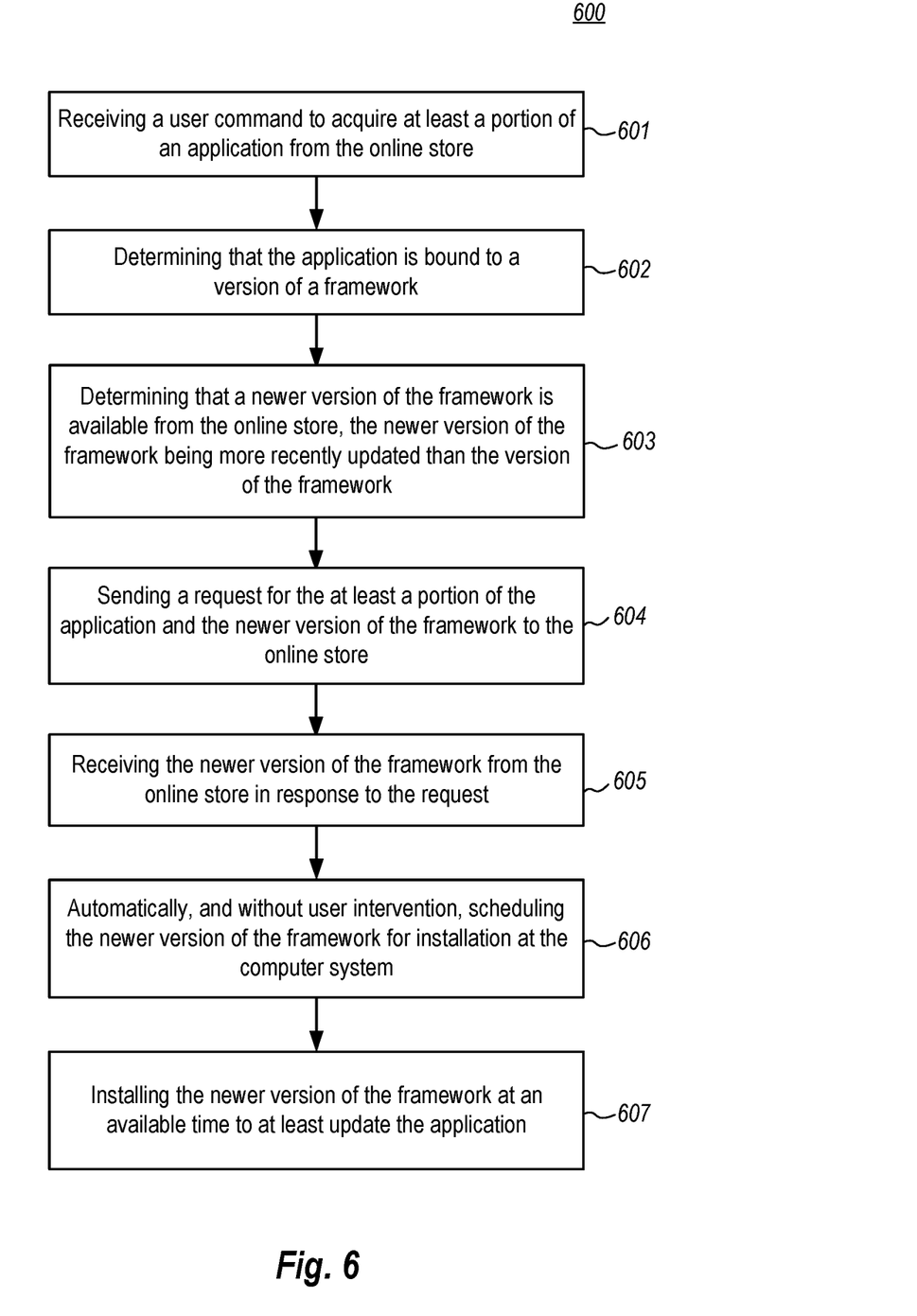
FIG. 6 illustrates a flow chart of an example method for updating software components through an online store.

FIG. 6 illustrates a flow chart of an example method 400 for updating software components through an online store. Method 600 will be described with respect to the components and data of computer architecture 500.

Method 600 includes receiving a user command to acquire at least a portion of an application from the online store (601). For example, agent 504 can receive application update command 543 form user 517. Application update command 543 can instruct agent 104 to request any updates for application 511 from online store 521.

Method 600 includes determining that the application is bound to a version of a framework (602). For example, agent 504 can determine that application 511 is bound to framework 514. Method 600 includes determining that a newer version of the framework is available from the online store, the newer version of the framework being more recently updated than the version of the framework (603). For example, agent 504 can determine that a newer version of framework 514 is available at online store 521. Agent 504 can communicate with online store 521 over network 509 to determine that a newer version of framework 514 is available.

Alternately, agent 504 may not determine that a newer version of framework 514 is available.

In any event, agent 504 can formulate update request 531. Update request 531 can request both updates to application 511 and updates to framework 514.

Method 600 includes sending a request for the at least a portion of the application and the newer version of the framework to the online store (604). For example, agent 504 can send update request 531 to online store 521. Update request 531 requests updates to application 511 and updates to framework 514.

Online store 521 can receive update request 531. Online store 521 can identify available application update 534 (for application 511) and framework update 533 (for framework 514). Online store 521 can send application update 534 and framework update 533 to computer system 501.

Method 600 includes receiving the newer version of the framework from the online store in response to the request (605). For example, agent 504 can receive framework update 533 (and also application update 534) from online store 521.

Method 600 includes automatically, and without user intervention, scheduling the newer version of the framework for installation at the computer system. Method 600 includes installing the newer version of the framework at an available time to at least update the application. For example, scheduler/installer 503 can schedule installation of and install framework update 533 to update framework 514. Scheduler/installer 503 can schedule installation of and install application update 534 to update framework application 511.

In some embodiments, during user initiated "acquiring an Application" and "Interactive updating" applications and/or frameworks can get installed as part of the same user initiated command and essentially immediately. The user is relieved from having to perform other actions. Installation is handled internally once corresponding Applications, Frameworks are returned by the Online Store, by downloading them and post download doing the install for the user.

Additional Embodiment

Figure 7:
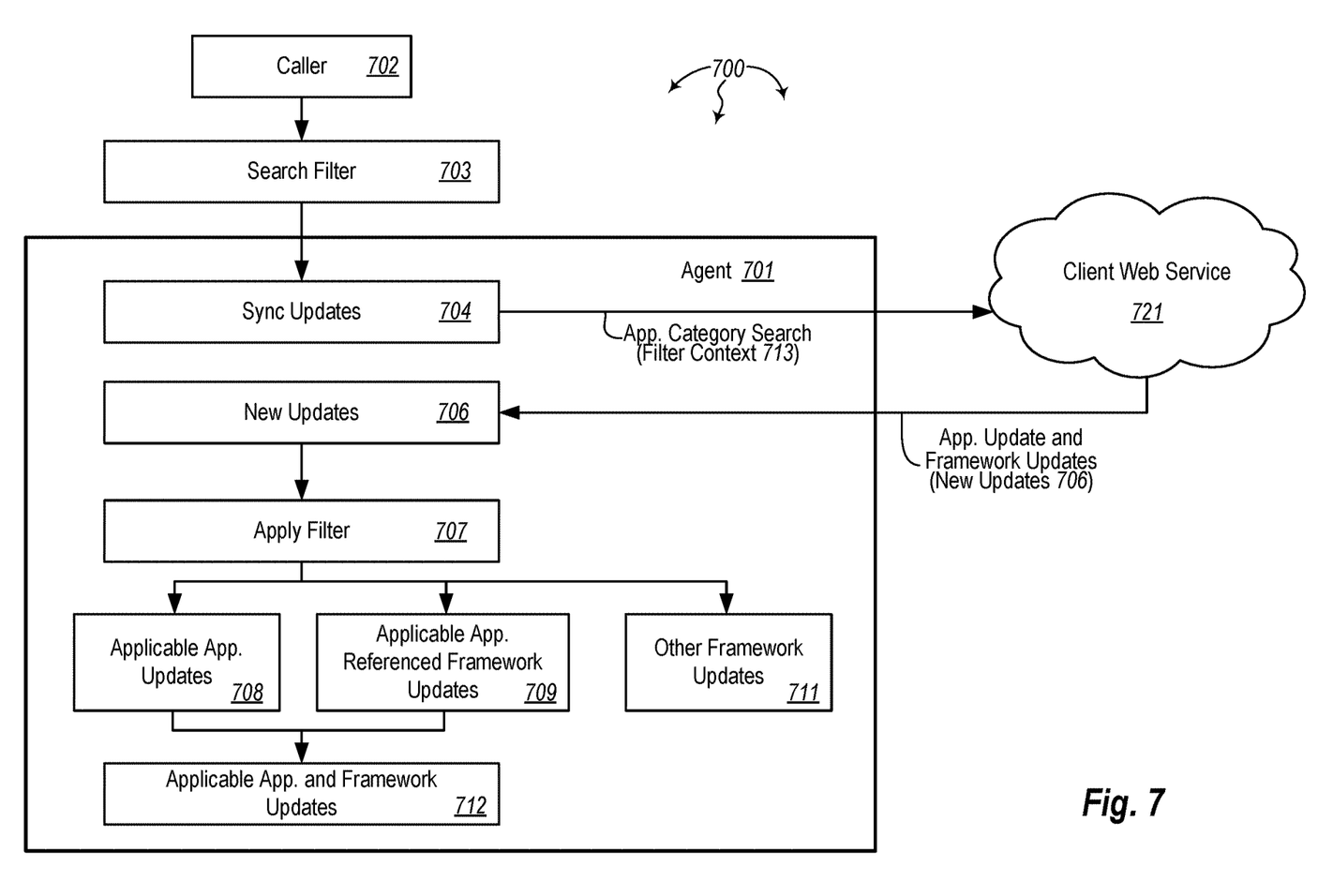
FIG. 7 illustrates a data flow within an example computer architecture that facilitates updating software components through a Web service.

FIG. 7 illustrates a data flow within an example computer architecture 700 that facilitates updating software components through a Web service. As depicted, computer architecture 700 includes agent 701, caller 702, search filter 703, and client web server 721. Agent 701 includes sync updates 704, new updates 706, apply filter 707, applicable app. updates 708, applicable app. referenced framework updates 709, other framework updates 711, and applicable app. and framework updates 712.

Caller 702 can be an operating system store for interactive activities, automatic updates for automatic background activities, or other such scenarios. Caller 702 can initiate a scan (e.g., sync updates 704) against Client Web Service 702, specifying a search filter 703. For example, a scan can be a search for an update for a single app, multiple apps, or all apps on the system. A search filter context 713 is sent to Client Web Service 702. Client Web Service 702 returns applicable applications and frameworks (e.g., new updates 706).

Based on search context 713 and/or based on the specific scenario being executed, apply filter 707 can sort updates into applicable app. updates 708 (updates for applications themselves), applicable app. referenced framework updates 709 (specific framework updates used by application updates), and other framework updates 711 ("other" framework updates to be installed independently). Applicable app. and framework updates 712 are installed, for example, following a maintenance window installation schedule established in an operating system.

5. Applicable application and framework updates are then installed, for example, following a maintenance window installation scheduling established in an operating system.
Installation Scheduling Algorithm As described, applications and frameworks can be automatically installed by an operating system. After a successful download, applications and/or frameworks can be scheduled for installation during an operating system's maintenance window. If a computing device is off or suspended during the maintenance window, installation attempts can be rescheduled for system idle time. If after specified period of time (e.g., three days) those installations are unsuccessful, the installations can be further rescheduled to the next time a user logs in. Installations can be attempted for user accounts currently logged into a computing device. For any user accounts with applications and/or frameworks installed, but that are not logged in, installation of updates are rescheduled for the next user log-in of each of those user accounts.

If at any of the above times, an application is in use in the foreground, or is playing media in the background, the update can silently fail so as to not interrupt the user by force-closing the application. Installation can then be rescheduled according to the same or similar logic. On the other hand, installation of updates is not blocked by applications that are suspended or that have scheduled background tasks. Installations can move forward with application state and tasks being preserved throughout the update.

Further Embodiments

As described, applications and framework can be handled completely independently from each other. When acquiring new applications from an online store, simultaneous acquisitions of the latest frameworks used by that application can occur. When an operating system automatically updates applications in the background, a parallel check for updated frameworks can occur as well. Any applicable updates for each (applications and/or frameworks) can be automatically updated in the background. An agent can check that a computing device is not on a metered internet connection or battery power. The agent can suspend updates until both of those conditions abate.

When checking for updates interactively, a simultaneous acquisition of the latest framework(s) used by an application can take place. Thus, two separate operations happen at essentially the same time rather than a single operation that attempts to bring application and framework down as a group. This separate independent process for updating frameworks helps ensure developers that newer framework versions are being used. Further, customers need not worry about framework updates. To customers, frameworks and framework updates may completely invisible, and simply a part of the system that lets everything "just work".

Telemetry is can be sent for each download, so that the knowledge workers can monitor quality as they manage new releases.

Accordingly, embodiments of the invention provide an end-to-end solution that permits application packages to be smaller and helps alleviate developer worry about distributing common frameworks with their applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising:
one or more hardware processors;
system memory coupled to the one or more hardware processors, the system memory storing instructions that are executable by the one or more hardware processors; and
the one or more hardware processors executing the instructions stored in the system memory to receive updates to software components stored at the computer system, including the following:
send an application update query to an online store, the application update query querying the online store for updates to any of a plurality of applications that were developed with and installed along with different frameworks;

send a separate framework update query to the online store in parallel with the application update query, the framework update query querying the online store for updates to any frameworks used to develop and installed along with any of the plurality of applications;

receive a framework update in response to the framework update query, the framework update including an update to a framework, the framework update being updated relative to a framework used to develop and be installed along with a sub-plurality of applications at the computer system, the sub-plurality of applications selected from among the plurality of applications; and install the framework update during an operating system maintenance window to replace use of the framework by the sub-plurality of applications with the framework update, wherein one or more of the plurality of applications was at least one of not developed with or not installed along with the framework update.

2. The computer system of claim 1, further comprising the one or more hardware processors executing the instructions stored in the system memory to schedule the framework update for installation at the computer system during the operating system maintenance window, even though the sub-plurality of applications were not developed with nor installed along with the framework update.

3. The computer system of claim 1, further comprising the one or more hardware processors executing the instructions stored in the system memory to:

receive an application update, the application update including an update to an application installed at the computer system, the application selected from among the sub-plurality of applications;

schedule the application update for installation at the computer system during the operating system maintenance window;

install the application update during the operating system maintenance window; and wherein the one or more hardware processors executing the instructions stored in the system memory to install the framework update during the operating system maintenance window comprise the one or more hardware processors executing the instructions stored in the system memory to install the framework update to replace use of the framework with use of the framework update for at least one application, even though an application update for the at least one application was not received in response to the application update query, the at least one application selected from among the sub-plurality of applications.

4. The computer system of claim 2, wherein the one or more hardware processors executing the instructions stored in the system memory to schedule the framework update for installation at the computer system during an operating system maintenance window comprise the one or more hardware processors executing the instructions stored in the system memory to determine that the framework update is to be separately installed for each of a plurality of user accounts at the computer system.

5. The computer system of claim 4, wherein the one or more hardware processors executing the instructions stored in the system memory to install the framework update comprise the one or more hardware processors executing the instructions stored in the system memory to:

detect that a first user account, from among the plurality of user accounts, is logged into the computer system; and while the first user account is logged into the computer system:
install the framework update for the first user account; and
install the framework update for a second user account, from among the plurality of user accounts, during system idle time.

6. The computer system of claim 3, further comprising the one or more hardware processors executing the instructions stored in the system memory to:

track update telemetry for the application update; and track separate update telemetry for the framework update; and wherein the update telemetry and the separate update telemetry are used for monitoring the quality of managed releases of applications and frameworks.

7. The computer system of claim 1, wherein the one or more hardware processors executing the instructions stored in the system memory to install the framework update comprises the one or more hardware processors executing the instructions stored in the system memory to install the framework update at the computer system a plurality of times, each installation of the framework update installed for a different account from among a plurality of different accounts at the computer system.

8. The computer system of claim 1, further comprising the one or more hardware processors executing the instructions stored in the system memory to determine that a network connection between the computer system and the online store is not a metered connection.

9. The computer system of claim 1, wherein the online store sells software applications configured for use with the operating system, the operating system selected from among: Microsoft® Windows®, Apple® iOS®, and Google® Android™.

10. The computer system of claim 1, wherein the one or more hardware processors executing the instructions stored in the system memory to install the framework update comprises the one or more hardware processors executing the instructions stored in the system memory to install the framework update to replace use of the framework by two or more applications with use of the framework update by the two or more applications.

11. A method for use at a computer system, the method for receiving updates to software components stored at the computer system, the method comprising:

sending an application update query to an online store for a plurality of applications that were developed with and installed along with different frameworks;

sending a separate framework update query to the online store in parallel with the application update query, the framework update query querying the online store for updates to any frameworks used to develop and installed along with any of the plurality of applications;

receiving a framework update in response to the framework update query, the framework update including an update to a framework, the framework update being updated relative to a framework used to develop and be installed along with a sub-plurality of applications at the computer system, the sub-plurality of applications selected from among the plurality of applications; and installing the framework update during an operating system maintenance window to replace use of the framework by the sub-plurality of applications with the framework update, wherein one or more of the sub-plurality of applications was at least one of not developed with or not installed along with the framework update.

12. The method of claim 11, further comprising scheduling the framework update for installation at the computer system during the operating system maintenance window, even though the sub-plurality of applications were not developed with nor installed along with the framework update.

13. The method of claim 11, further comprising:
receiving an application update, the application update including an update to an application installed at the computer system, the application selected from among the sub-plurality of applications;
scheduling the application update for installation at the computer system during the operating system maintenance window;
installing the application update during the operating system maintenance window; and
wherein installing the framework update during the operating system maintenance window comprises installing the framework update to replace use of the framework update with use of the framework update for at least one application, even though an application update for the at least one application was not received in response to the application update query, the at least one application selected from among the sub-plurality of applications.

14. The method of claim 13, wherein scheduling the framework update for installation at the computer system during an operating system maintenance window comprises determining that the framework update is to be separately installed for each of a plurality of user accounts at the computer system.

15. The method of claim 14, wherein installing the framework update comprises:
detecting that a first user account, from among the plurality of user accounts, is logged into the computer system; and
while the first user account is logged into the computer system:
installing the framework update for the first user account; and
installing the framework update for a second user account, from among the plurality of user accounts, during system idle time.

16. The method of claim 13, further comprising:
tracking update telemetry for the application update; and
tracking separate update telemetry for the framework update; and
wherein the update telemetry and the separate update telemetry are used for monitoring the quality of managed releases of applications and frameworks.

17. The method of claim 11, wherein installing the framework update comprises installing the framework update at the computer system a plurality of times, each installation of the framework update installed for a different account from among a plurality of different accounts at the computer system.

18. The method of claim 11, further comprising determining that a network connection between the computer system and the online store is not a metered connection.

19. The method of claim 11, wherein the online store sells software applications configured for use with the operating system, the operating system selected from among: Microsoft® Windows®, Apple® iOS®, and Google® Android™.

20. The method of claim 11, wherein installing the framework update comprises installing the framework update to replace use of the framework by two or more applications with use of the framework update by the two or more applications.

* * * * *